Patented Apr. 8, 1930

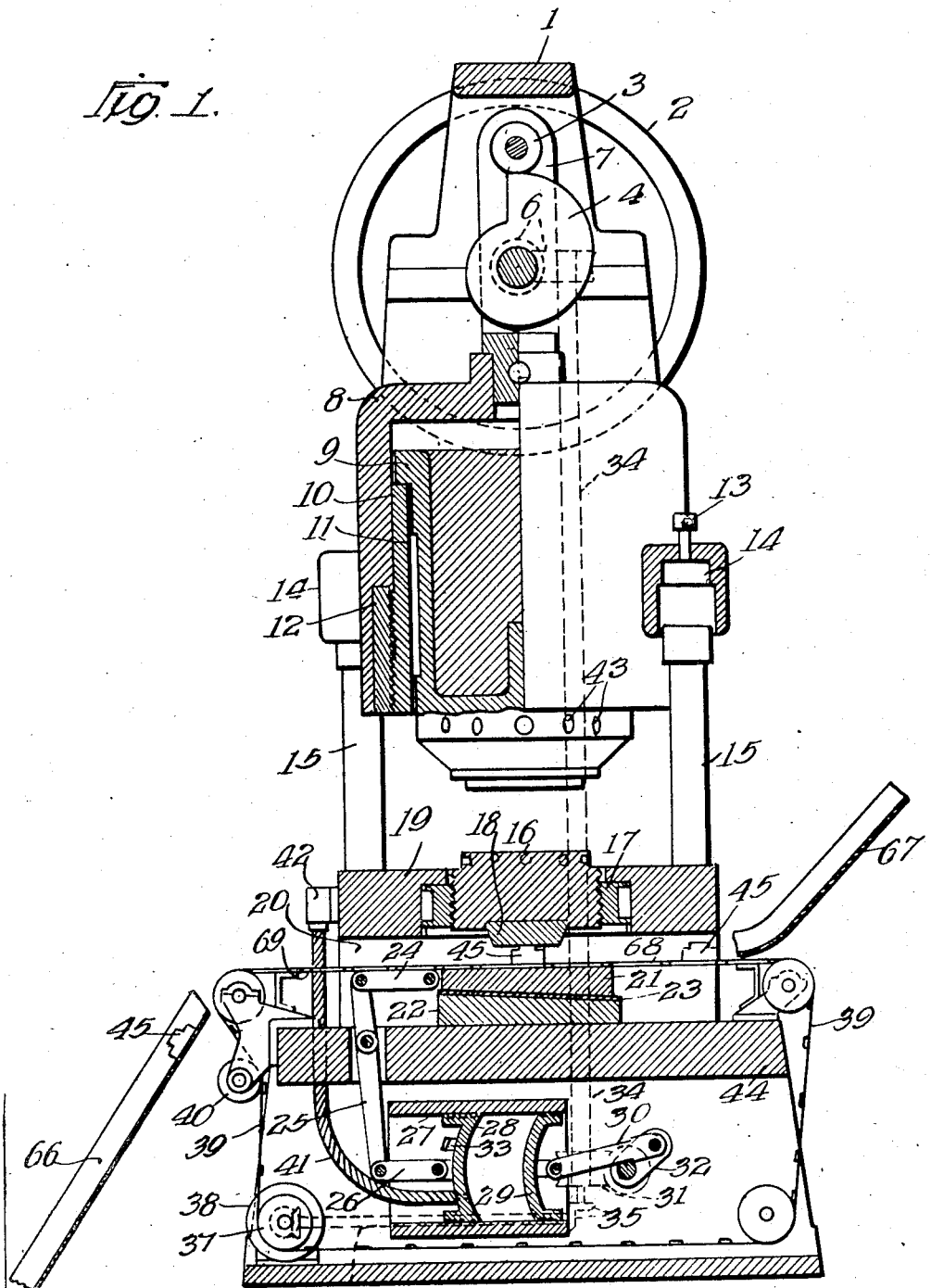

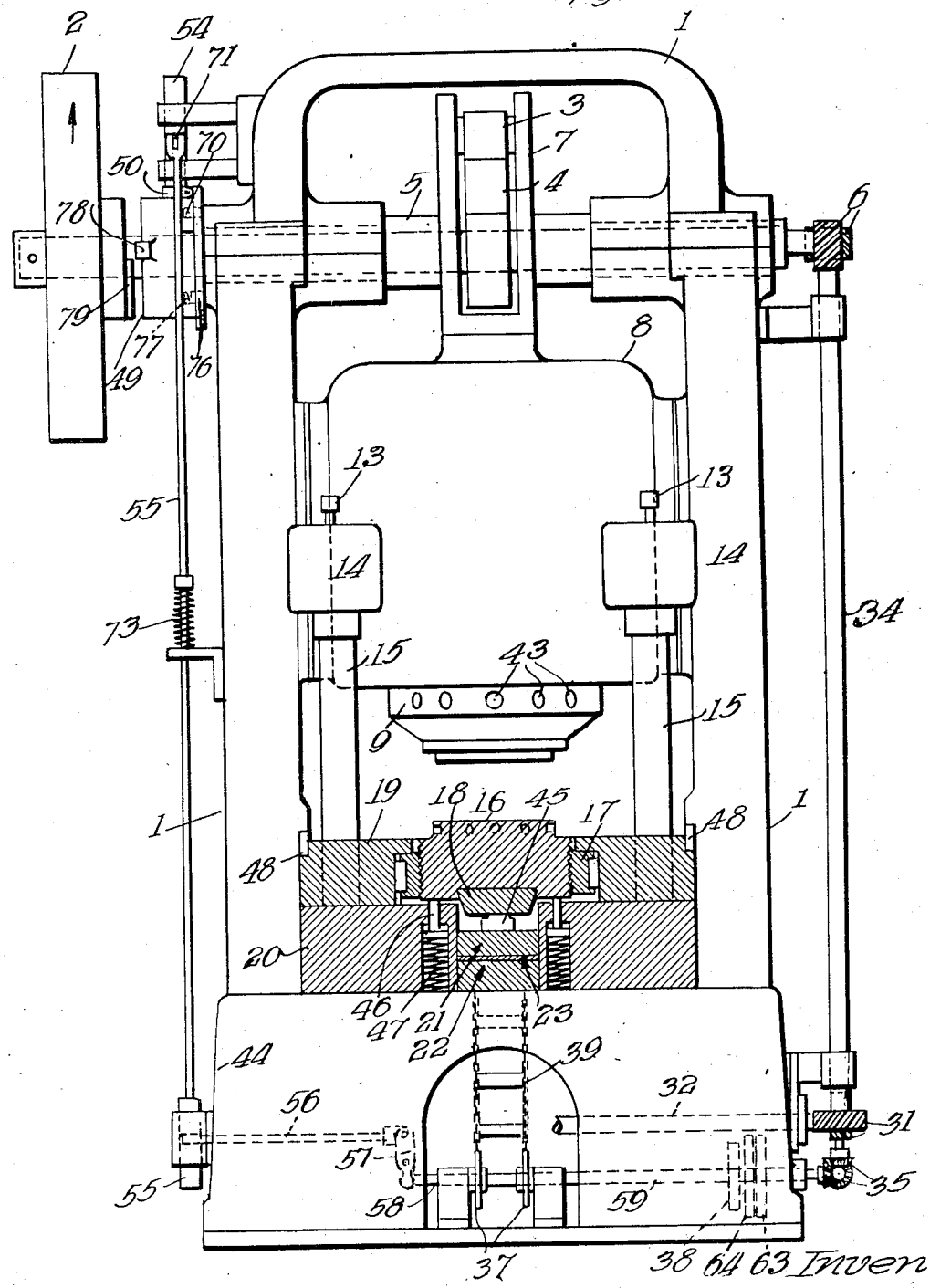

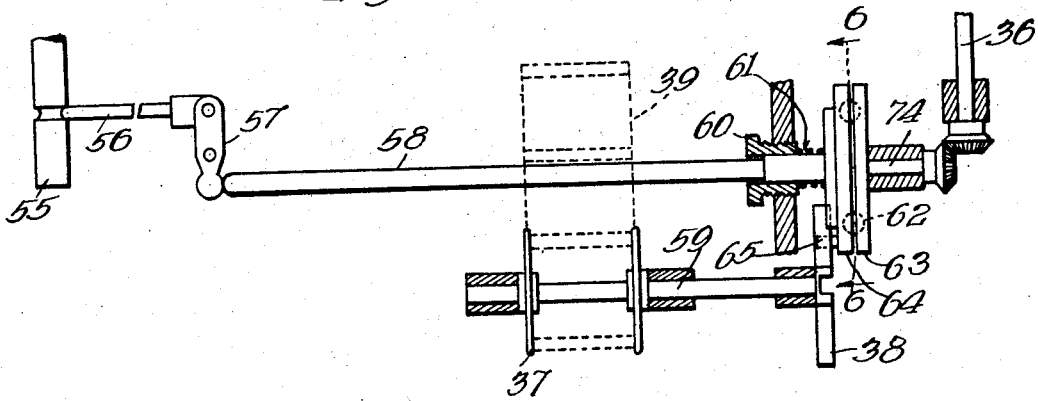
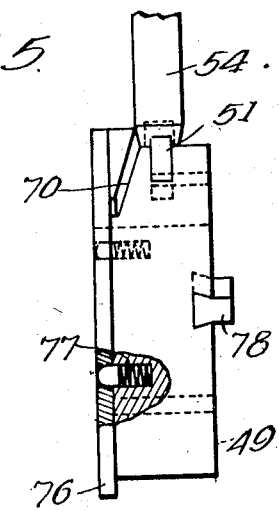
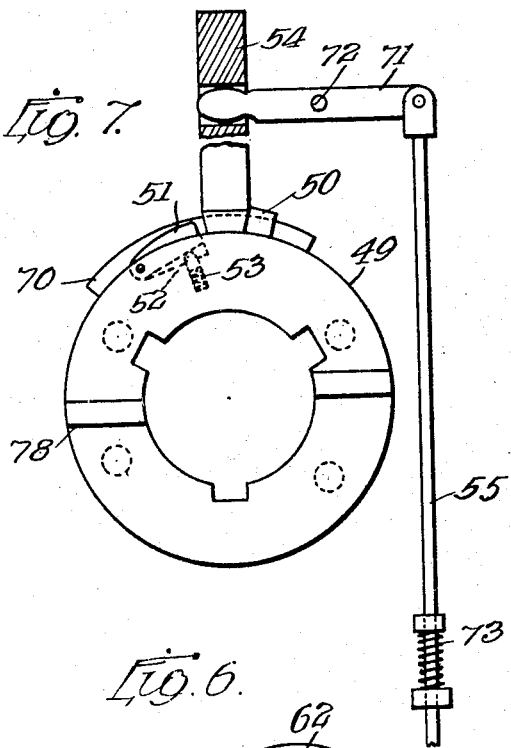
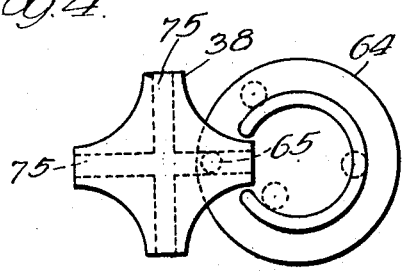
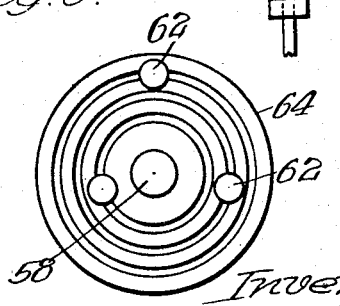

1,753,250

UNITED STATES PATENT OFFICE

WILLIAM E. SHARP AND GEORGE F. SANDSTROM, OF CHICAGO, ILLINOIS, AND GEORGE H. RIDLON, OF SOUTH WHITLEY, INDIANA; SAID SANDSTROM AND RIDLON ASSIGNORS TO SAID SHARP

DEFLECTING MACHINE

Application filed March 5, 1925. Serial No. 13,230.

Our invention belongs to that general type of devices designed to cooperate with other devices in the manufacture of bolt nuts adapted to so engage with cooperating bolts that they will not readily become disengaged by reason of vibration or shocks.

It is particularly designed to automatically deflect one or more threads out of the normal plane in the threaded nut, such deflection being accurately measured and gauged in order to secure exactly the desired engaging or locking effect with the bolt.

In devices of this kind the nut blank may be formed as desired and the thread cut therein by other mechanism, after which means are provided to so deflect a portion of the nut as to change the lead of the threads which are near that point, thus resulting in an increased frictional engagement for the purpose stated.

The deflection, however, is slight to secure the result desired, making it desirable that the amount of deflection shall be uniform, notwithstanding the slight variation in the thicknesses of the different nuts as they are fed to the machine.

To this end our invention consists in the novel construction, arrangement and combination of parts herein shown and described, and more particularly pointed out in the claims.

In the drawings, wherein like reference characters indicate like or corresponding parts:

Fig. 1 is a central vertical section of our improved machine, illustrating the preferred form and arrangement of parts to secure the results desired;

Fig. 2 is an elevation taken at right angles to the position shown in Fig. 1, certain parts being in section to more clearly illustrate the construction;

Fig. 3 is a diagrammatic detailed view partly in section, illustrating the mechanism adapted to control certain movements of the mechanism;

Fig. 4 illustrates the cooperating mechanism for imparting an operative movement to the feeding chain of the device;

Fig. 5 is an edge view with a part shown in section of the controlling mechanism shown at the upper left hand corner of Fig. 2;

Fig. 6 is a section on line 6—6 of Fig. 3; and

Fig. 7 is a side elevation of the controlling mechanism shown in Fig. 5.

In the drawings, 1 (Fig. 2) illustrates a suitable supporting frame for the mechanism, which is provided with a driving fly wheel or pulley 2, cooperating with suitable clutch mechanism to periodically engage and drive the operating shaft 5 which actuates the mechanism.

Referring particularly to Figs. 1 and 2, it will be seen that the device is provided with a vertically movable ram 8 suitably guided in the frame, the upper part of the ram being provided with an extending portion or cam yoke 7. The upper part of the yoke is provided with an anti-friction roller 3 cooperating with a cam 4 mounted upon the shaft 5 and desirably formed spiral in outline so as to gradually raise the ram 8 and then suddenly release and permit it to fall by gravity.

At the end of the shaft 5, opposite to the driving pulley or fly wheel, a spiral drive gear 6 is provided by means of which the shaft 34 connected therewith transmits the movement to other spiral drive gears, and cooperating with actuating means timed to bring about the desired operation. The ram 8 is provided with a centrally positioned hammer 9 adjustably mounted in the ram in such manner that the vertical position of the hammer 9 therein may be adjustably arranged to secure an impact that will produce the amount of deflection desired. As shown in Fig. 1, the hammer 9 is keyed to a sleeve 10 by means of a key 11, in such manner that by rotating the hammer by means of a rod or bar in the adjusting holes 43, the hammer may be raised or lowered by its threaded engagement with the cooperating sleeve or bushing 12. Thus, while the ram maintains its constant stroke by reason of being actuated by the cam 4, the vertical movement of the hammer 9 is nicely regulated for the purpose stated.

In the preferred construction, the machine is provided on each side with a dashpot 14 to assist in breaking the fall of the ram after it has reached its adjusted limit of movement. In the form shown, 13 is a check valve to regulate the operation of the dashpot 14, while 15 indicates the dashpot piston. One of these dashpots is provided on each side of the machine, as indicated. The movement of the piston in the dashpot, after being cushioned by compression of air, is limited by the upper or end wall of said dashpot. Below the hammer and in line and cooperating therewith, is provided a block 16 adjustably supported in a vertical direction by the threaded engagement with the gauge 17 keyed to the top plate 19. Thus it will be seen that the hammer and its cooperating block, in the preferred form, are each adjustable as may be desired.

The block 16 is provided with what may be termed an anvil block 18 which contacts with the upper surface of the nut as here shown. Beneath the block 16 and its anvil block 18 are bottom blocks 20, one on either side (Fig. 2), between which the nuts are carried in line with the anvil block. The distance between the adjusted position of the block 16 and the bottom blocks 20 determines the amount of set or deflection.

As shown in Figs. 1 and 2, a movable wedge shaped anvil 21 is arranged below the position occupied by the nut, and by suitable means may be moved backward and forward so that in cooperation with other parts the horizontal plane occupied by the nut may be regulated, thus bringing the nut up to firm engagement with the anvil block 18 to insure the precise deflection desired. Beneath the wedge 21 is arranged a cooperating wedge support 22, while between the two is preferably arranged a wear or anti-friction plate 23, or equivalent means.

24 is a link attached to the wedge 21 engaged with the wedge lever 25, which is in turn connected with a link 26 connected to a vacuum piston 28 mounted within the cylinder 27. Thus, as the piston 28 is moved longitudinally within its cylinder, the wedge anvil 21 will be moved backward or forward to properly position and gauge for thickness the nut thereon for the action desired. 29 is a cooperating piston within the cylinder 27, so that as the piston 29 advances or recedes, the vacuum between the pistons serves as the actuating means of the various parts described to secure the movement of the anvil wedge 21. It is, of course, understood that the anvil 21 is operated or reciprocated once during each cycle of operations. It is also apparent that mechanism must be adjusted each time a series of nuts are passed through the machine, which nuts are of a different size than the ones previously handled by the machine.

Referring now to Fig. 2, the rod or shaft 34 actuated by the spiral gear 6 described, or equivalent mechanism, at its lower end actuates a similar gear 31 driving a shaft provided with a crank shaft 32 carrying a connecting rod 30 which at one end engages the piston 29.

A check valve 33 is provided to cooperate with the movement described and insure the proper operation of the pistons, and the power operative vacuum in the chamber between them. Below the gear 31 and also actuated by the shaft 34 is a bevel gear 35 or equivalent mechanism. The gear 35 rotates the chain drive shaft 59 (see Fig. 2) provided with a chain drive sprocket 37. This is provided with a positive release 38 which trips the press if the chain sticks or the nut gets caught in any way. (This is accomplished, as shown, by an ordinary Geneva motion drive, shown in Fig. 4.) 39 is the feed chain for conveying the nuts under the press. 40 is an idler or tensioning sprocket for the feed chain 39.

In the form shown, a flexible steel tubing or equivalent part 41, provided with an adjustable regulating relief valve 42, extends to the piston 28. This, when adjusted, serves to automatically regulate vacuum mechanism and hence the range of the pressure accomplished by the wedge construction 21—22.

The wedge 22 rests upon a suitable base 44 which also serves as a support for those parts of the device arranged in proximity thereto. 45 indicates the nut at various points in its travel, one being shown on the anvil wedge 21 in position to be deflected by the stroke of the hammer 9.

Referring now to Fig. 2, it will be noted that in the bottom block 20 suitable pockets are formed, each carrying a spring 47 actuating the vertically movable rods 46 which extend beneath and normally hold the block 16 at the upper limit of movement permitted by its adjustment as heretofore described. As the hammer 9 strikes the block 16, the deflection is substantially regulated by the distance between the block 16 and the bottom block 20. After the stroke has been given and the hammer and its associated parts are moved upward by the rotation of the cam 4, the resiliency of the springs 47 will force the rods 46 upward and the block 16 to normal position, as shown. 48—48 are simply assembly wedge keys to properly center and secure the parts together.

Referring now to Figs. 2 and 5, 49 is a clutch drum adapted to engage the driven pulley or fly wheel 2 to actuate the machine. Any equivalent device may be employed for the purpose. In the preferred form shown, a stop pin 50 is carried by the drum 49 adapted to contact with the trip dog 54. 51 is a resiliently supported safety stop over which the dog passes, serving to accurately position and retain the dog at the proper point upon the drum. As shown, the stop 51 is maintained at its upper limit of movement by means of a suitable plunger 52 resting upon a spring 53 carried in the socket in the drum.

54 is a trip dog controlling the rotation of the clutch drum 49. 55 is the trip dog rod, which extends upward and engages the lever 71 pivoted at 72 (Fig. 7), which engages the trip dog 54. When the rod 55 is held at the limit of its downward movement as indicated in Fig. 2, it depresses the end 71 of the lever and lifts the trip dog 54 to a point where it will release the clutch 49 and permit it to rotate. A spring 73 or equivalent means on the rod 55 serves to force the rod upward when it is released, thus forcing the lever 71 upward and moving the trip dog 54 down to the point where it will engage and stop the rotation of the clutch 49. As shown in the drawings, 56 is a rod pivotally engaging the rod 55, so that when the parts are in the position indicated in Fig. 2, the rod 55 will be held at its downward limit, as stated, lifting the trip dog 54 out of engagement with the clutch. 57 is a lever at one end engaging the rod 56, these parts being all more clearly shown and illustrated in Fig. 3. 58 is a push rod which by its end movement engages the lever 57 in such manner as to withdraw the rod or bar 56 from engagement with the rod 55, permitting the latter to move upward. 59 is the shaft driving the sprocket which operates the feed chain 39. The said shaft is driven by the rotation of the part 38 of the Geneva motion drive shaft (Fig. 4). 60 indicates an adjusting sleeve for accurately adjusting the movement of the push rod or bar 58, and 61 is a spring to be explained hereafter.

63 and 64 are parallel drive plates, 63 being positively driven by its connection with the shaft 74, and the plate 64 being held in spaced contact therewith by means of the spring 61. Between the two plates, arranged in suitable pockets for the purpose, are steel balls or equivalent means insuring the driving of the plate 64 by said engagement with the driven plate 63. The plate 64 carries a pin 65 which engages with the slots 75 in the part 38, thus providing yielding driving means for said part 38 and its associated parts.

66 indicates a chute for receiving the nuts and conducting them away from the machine, while 67 is a similar feed chute, and 69 shows a table over which the nuts are passed by the forward movement of the chain, delivering them to the chute 66.

As shown in Fig. 2, the drive clutch drum 49 slidingly engages the shaft 5, a plate 76 being fixedly mounted on the frame against which the drum 49 rests when the machine is at rest. Springs 77 carried in suitable pockets between the drum 49 and the fixed plate 76 tend to resiliently force the drum 49 toward the fly wheel 2. A cam 70 carried by the drive clutch drum 49, as shown in Fig. 5, is adapted to contact with the side of the trip dog 54 to force the drive clutch drum 49 to its rearward limit, disengaging the clutch members 78 and 79, constituting the clutch-engaging members of the device.

Referring once more to Fig. 3, if the chain 39 be stopped by any obstruction or improper arrangement of the nuts, this would stop the shaft 59, together with the star member 38. This in turn would hold the pin 65 rigidly and stop the rotation of the plate 64. The driving of the plate 63 forward would force the steel balls 62 out of their sockets or recesses, and as they pass out of the same, would serve to force the plate 64 to the left, as appears in Fig. 3, against the action of the spring 61, thus forcing the push rod 58 endwise, operating the lever 57 and withdrawing the rod 56 from its engagement with the rod 55. By reason of the action of the spring 73, this latter rod would move upward as clearly shown in Fig. 5, forcing the trip dog 54 downward, in which the cam 70 will force the clutch member 49 backward to its seat, while the rotation of the clutch drum 49 would cause the trip dog to pass over the latch 51 against the pin 50, thus bringing the clutch drum 49 and the machine to a stop.

When it is desired to start the machine, drawing the rod 55 downward either by hand or an ordinary foot lever, until it is engaged by the rod 56, will lift the trip dog out of its position shown in Fig. 5, permitting the drum 49 to be forced toward the fly wheel 52 until the clutch engages, when the machine will again be actuated.

When it is desired to stop the machine, drawing the push bar 56 (Figs. 2 and 3) to the right by hand or suitable foot lever, will release the rod 55 from engagement therewith and stop the machine as described.

The distance between the threads of a nut is so limited, and the operable deflection contemplated being only a fraction of that distance, it is obvious that the various means of adjustment for the parts to secure this exact relative deflection is most important. If the deflection should be too slight, the practical engagement of the nut with the bolt desired will not be secured, while if the deflection is too great, the reverse evil and difficulty is present, possibly rendering the engagement of the nut with the bolt very difficult, or perhaps impossible.

With this in mind, it will be seen that the machine herein described has been very carefully provided with practical means to secure and control such exact adjustment.

Thus, for illustration, the drawings clearly show that the hammer 9 by means of its threaded engagement with the ram 8 is capable of the most exact adjustment therein to secure the exact impact required for the purpose stated. In connection with this also, the adjustable means for limiting the downward movement of the hammer, bringing it to rest at the exact point required to secure the most satisfactory result, is provided in the dash-pot construction, which is also controllable and adjustable, as clearly pointed out. In addition to this also, the block 16 cooperating with the hammer 9 and regulating the blow upon the nut, is provided with the most exact adjustable means, as clearly shown in Figs. 1 and 2.

While all of these parts are capable of independent adjustment, they are also capable of very complete and exact adjustment in cooperation with the other parts described to secure the most complete and exact operation of the machine to secure the perfect deflection desired.

Practical operation demonstrates the most perfect results for the purpose stated. Without undertaking to define equivalents to secure such a perfect result, it is obvious that one or more of these adjustable means may be modified to a considerable extent without sacrificing the perfect result desired, and having thus described our invention, it is obvious that various immaterial modifications may be made in the same without departing from the spirit of our invention; hence we do not wish to be understood as limiting ourselves to the exact form, construction, arrangement and combination of parts herein shown and described, or the uses mentioned.

What we claim as new and desire to secure by Letters Patent is:

1. A deflecting machine comprising a suitable frame provided with a vertically movable ram slidably mounted therein, means for raising said ram and permitting it to fall, and a hammer member carried by the ram, said hammer member being adjustable longitudinally of the ram, in combination with a cooperating block adjustably mounted in the frame, said block being permitted a slight vertical movement, means for resiliently maintaining said block vertically in adjusted position, an anvil piece below said block, actuating means for bringing a nut placed on the anvil piece in snug contact with the block, whereby upon the falling of ram and its hammer the said cooperating block will be given a blow sufficient to move it to its lower limit and bring about a limited deflection of the threads in the nut.

2. In a device of the kind described, a suitable frame provided with a vertically movable ram slidably mounted therein, means for raising the ram and permitting it to fall, and a hammer member carried by the ram, said hammer member being adjustable longitudinally of the ram, in combination with a cooperating block adjustably mounted in the frame, means for resiliently maintaining the block in its upper adjusted position, a wedge shaped anvil piece below said block, means for actuating said anvil piece to bring a nut placed thereon in snug contact with the block whereby upon the falling of the ram and its hammer the said cooperating block will be given a blow to bring about a limited deflection of the threads in the nut, dependent upon the adjusted position of the block.

3. In a device of the kind described, a suitable frame provided with a vertically movable ram slidably mounted therein, means for raising said ram and permitting it to fall, adjustable means for cushioning the fall of the ram, and a hammer member carried by the ram, said hammer member being adjustable longitudinally of the ram, in combination with a cooperating block adjustably mounted in the frame, means for resiliently maintaining the block in its adjusted elevated position, an anvil piece arranged below the block, means for actuating said anvil piece to bring a nut placed thereon in snug contact with the block, a feed chain for bringing the nuts one by one in position upon the anvil piece to be operated upon, and means for actuating the feed chain in synchronism with the raising of the ram.

4. In a device of the kind described, a suitable frame provided with a vertically movable ram slidably mounted thereon, means for raising said ram and permitting it to fall, a clutch controlling said raising means, and a hammer member carried by the ram, said hammer member being adjustable longitudinally of the ram, in combination with a cooperating block adjustably mounted in the frame, means for resiliently maintaining said block in its adjusted vertical position, an anvil piece below said block, means actuating said anvil piece to bring a nut placed thereon in snug contact with the block, feeding mechanism arranged to place the nuts one by one upon the anvil piece in position to be operated upon, and means operated upon accidental stoppage of the feeding mechanism for automatically releasing the clutch.

5. In a device of the kind described, a frame, a vertically movable ram slidably mounted in the frame, means for raising the ram and permitting it to fall, a hammer carried by the ram, an adjustable cooperating block arranged below the hammer and resilient means for maintaining the block in its adjusted vertical position, in combination with a movable wedge shaped anvil piece arranged beneath the block, connecting mechanism extending from the anvil piece to a movable piston head in a vacuum cylinder, and means connected to the ram operating means for intermittently creating a partial vacuum in the cylinder in synchronism with movement of the ram, whereby movement of the said piston head will be transmitted to and actuate the anvil piece.

6. In a device of the kind described, an impact member with means for actuating the same, an adjustable cooperating block arranged below the impact member and resilient means for maintaining the block in its adjusted vertical position, in combination with a movable wedge shaped anvil piece arranged beneath the block, connecting mechanism extending from the anvil piece to a movable piston head in a vacuum cylinder, and actuating means connected to the impact member operating means for operating the cooperating piston, whereby a partial vacuum is intermittently formed within the cylinder in synchronism with the actuation of the impact member, actuating the first piston head and transmitting the movement thereof to the wedge shaped anvil piece.

7. In a device of the kind described, an impact member and means for operating the same, in combination with a cooperating block, an annular gauge threadedly receiving said block for vertical adjustment thereof, a base below the block limiting its downward movement, and spring pressed supporting bars for the block to resiliently maintain the block in its adjusted elevated position.

8. In a device of the kind described, an impact member and means for actuating the same, and adjustable cushioning means for cushioning the impact member as it reaches its lower limit of movement, in combination with a cooperating vertically movable block, an annular gauge threadably receiving said block for adjusting the position of the same in a vertical direction, resilient means for maintaining the block in its adjusted vertical position, and means for limiting the downward movement of the said block.

9. In a device of the kind described, an impact member, cooperating means arranged to transmit the impact to a bolt nut to deflect a portion of the threads therein, means for actuating the impact member, clutch mechanism for controlling the actuating means, in combination with a feed chain arranged to feed the nuts in position to be acted upon, means for actuating the chain provided with means to release the chain in case of accidental stoppage thereof, and intermediate means between the actuating means for driving the chain and the clutch controlling mechanism, whereby the stopping of the chain will disengage the clutch.

10. In a device of the kind described, a vertically movable impact member, a cooperating hammer, a sleeve threadably mounted in the impact member and supporting the hammer in adjusted position, and means for actuating the member, in combination with adjustable means for limiting and cushioning the downward movement of the impact member.

11. In a device of the kind described, a frame, a vertically movable impact member slidably mounted in said frame and provided with a cooperating hammer carried thereby, said hammer member being adjustable longitudinally of said impact member, in combination with adjustable means for limiting and cushioning the downward movement of the impact member, a cooperating contact block arranged to receive the blow of the hammer, means for bringing the block into a plurality of adjusted positions, and resilient means for normally maintaining the block in an elevated position.

12. In a device of the kind described, an impact member comprising a slidably mounted ram and a cooperating hammer carried thereby, said hammer being adjustable longitudinally of said ram, adjustable means for cushioning the blow of the impact member as it reaches its lower limit of adjusted movement, a cooperating block arranged to receive the blow of the hammer, means for adjusting the movement of said block, and an anvil wedge arranged below the block, and means for displacing the anvil wedge to adjust a nut placed thereon in position beneath the block to receive the controlled impact of the hammer.

13. An apparatus of the kind described, driving mechanism, an impact member, an anvil including a plurality of cooperating wedges, mechanism connecting one of said wedges to fluid pressure operated means, means connected to the driving mechanism for varying the pressure acting on the fluid pressure operated means in synchronism with movement of the impact member and for causing relative movement between the impact member and the anvil, and means independent of said last-mentioned means for causing relative movement between said impact member and said anvil.

14. A deflecting machine comprising a frame, a vertically movable impact member mounted in the frame, driving mechanism, means for gradually raising said impact member and suddenly releasing it from the driving mechanism to fall by gravity, a cooperating block vertically movable in the frame, resilient means for maintaining the block normally at the upper limit of its movement, an anvil piece disposed beneath said block, a block inclined on its upper face supporting said anvil piece, means for placing a nut on said anvil piece, means for moving said anvil piece on the inclined surface of said supporting block to raise the nut into snug contact with said cooperating block simultaneously with the fall of the impact member, whereby said impact member will move the cooperating block downwardly upon the nut to distort the latter to a predetermined extent.

15. In a device of the kind described, a suitable frame provided with a vertically movable ram slidably mounted thereon, means for raising said ram and permitting it to fall and a hammer member carried by the ram, said hammer member being adjustable longitudinally of the ram, in combination with a cooperating block adjustably mounted in the frame, means for resiliently maintaining said block in its adjusted vertical position, an anvil piece below said block, means actuating said anvil piece to bring a nut placed thereon in snug contact with the block, feeding mechanism including Geneva gearing for placing the nuts one by one upon the anvil piece in position to be operated upon, and means operated by accidental stoppage of the feeding mechanism to stop the operation of the device.

16. In a machine of the kind described, an impacting member, mechanism for actuating the same, a longitudinally movable wedge shaped anvil member, a cylinder and piston in said cylinder operatively connected to said anvil, a second piston in said cylinder, and means operating in synchronism with said actuating mechanism for reciprocating said second piston to cause fluid pressure to reciprocate the first mentioned piston.

17. In a machine of the kind described, a frame, a hollow ram slidably mounted in the frame, means for reciprocating said ram, an annular member screw threaded into said ram and adapted to be brought into a plurality of adjusted positions longitudinally thereof, a hammer member splined to said annular member and an anvil member mounted in said frame and alined with said hammer member.

18. A deflecting machine comprising a frame, a shaft journaled therein, a spiral cam mounted on said shaft, a vertically movable ram with an upwardly extending yoke associated with said cam, a roller mounted in said yoke and engaging said cam, and means for operating said shaft to cause the cam to gradually raise the ram and suddenly permit it to fall, a cooperating block mounted in the frame, said block being permitted a slight vertical movement, means for resiliently maintaining said block in uppermost position, an anvil piece beneath said block, and actuating means for bringing a nut on the anvil piece into snug contact with the block, whereby upon the falling of the ram, the cooperating block will be given a blow sufficient to lower it and distort the threads of the nut to a desired extent.

19. A deflecting machine comprising a frame, a shaft journaled therein, a spiral cam mounted on said shaft, a vertically movable impact member formed with an upwardly extending portion engaged by said cam upon turning of said shaft to gradually raise said member and suddenly permit it to fall, a block mounted in the frame and adapted for vertical movement, means for resiliently supporting said block in its uppermost position, a movable anvil piece arranged beneath said block, and means timed with the revolution of said shaft for moving the anvil piece to operative position to support a nut between said block and anvil piece during the operation of the impact member thereon.

In testimony whereof, we have hereunto signed our names.

WILLIAM E. SHARP.
GEO. F. SANDSTROM.

In testimony whereof, I have hereunto signed my name.

GEO. H. RIDLON.